(12) United States Patent
Wang et al.

(10) Patent No.: US 11,164,210 B2
(45) Date of Patent: Nov. 2, 2021

(54) METHOD, DEVICE AND COMPUTER STORAGE MEDIUM FOR PROMOTION DISPLAYING

(71) Applicant: BAIDU ONLINE NETWORK TECHNOLOGY (BEIJING) CO., LTD., Beijing (CN)

(72) Inventors: Yu Wang, Beijing (CN); Hao Huang, Beijing (CN); Deqiang Cao, Beijing (CN); Dongdong Su, Beijing (CN); Hongxing Fan, Beijing (CN); Hao Zhou, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/504,125

(22) Filed: Jul. 5, 2019

(65) Prior Publication Data

US 2020/0019989 A1    Jan. 16, 2020

(30) Foreign Application Priority Data

Jul. 13, 2018  (CN) .......................... 201810771538.0

(51) Int. Cl.
*G06Q 30/02* (2012.01)
*G06N 20/00* (2019.01)

(52) U.S. Cl.
CPC ......... *G06Q 30/0256* (2013.01); *G06N 20/00* (2019.01)

(58) Field of Classification Search
CPC ..... G06Q 30/0256; G06Q 30/02; G06N 20/00
See application file for complete search history.

(56) References Cited

U.S. PATENT DOCUMENTS

| 2015/0278691 A1* | 10/2015 | Xia ................... G06F 16/90344 706/11 |
| 2015/0347519 A1* | 12/2015 | Hornkvist ........... G06F 16/9537 707/722 |

(Continued)

FOREIGN PATENT DOCUMENTS

| CN | 104063521 A | 9/2014 |
| CN | 107679186 A | 2/2018 |

(Continued)

OTHER PUBLICATIONS

Steichen et al., "A comparative survey of Personalised Information Retrieval and Adaptive Hypermedia techniques" (published in Information Processing & Management, vol. 48, Issue 4, Jul. 2012, pp. 698-724) (Year: 2012).*

(Continued)

*Primary Examiner* — Abhishek Vyas
*Assistant Examiner* — Patrick Kim
(74) *Attorney, Agent, or Firm* — Ladas & Parry, LLP

(57) ABSTRACT

A method, a device and a computer storage medium for promotion displaying are disclosed. The method includes: using user's behavior data to perform intent recognition for the user; under the condition that an intent in a specific class is recognized, determining a target entity corresponding to the recognized intent in the specific class; expanding the recognized intent in the specific class using attribute information of the target entity; and displaying promotional data corresponding to the intent obtained from the expansion to the user. According to the technical solution, promotional data may be displayed to the user according to the user's intent, and thus the displaying efficiency and coverage rate of the promotional data may be improved.

4 Claims, 2 Drawing Sheets

(56) References Cited

U.S. PATENT DOCUMENTS

2018/0082183 A1* 3/2018 Hertz .................... G06Q 10/10
2018/0095967 A1* 4/2018 Kota ..................... G06N 20/10

FOREIGN PATENT DOCUMENTS

CN  107807957 A  3/2018
CN  107832414 A  3/2018

OTHER PUBLICATIONS

First Office Action and Search Report from CN app. No. 201810771538.0, dated Jul. 5, 2021, with English translation from Global Dossier.

\* cited by examiner

METHOD, DEVICE AND COMPUTER STORAGE MEDIUM FOR PROMOTION DISPLAYING

CROSS REFERENCE TO RELATED APPLICATION

The present application claims the priority to Chinese Patent Application No. 201810771538.0, filed on Jul. 13, 2018, with the title of "Method, apparatus, device and computer storage medium for promotion displaying". The disclosure of the above application is incorporated herein by reference in its entirety.

TECHNICAL FIELD

The present disclosure relates to the technical field of communications, and particularly to a method, a device and a computer storage medium for promotion displaying.

BACKGROUND

As the Internet develops rapidly, the Internet promotion is gradually becoming an important channel for an advertiser to promote its goods and service. An Internet enterprise, as a supplier of promoted service, will describe promotion audience from a plurality of dimensions, to assist the advertiser in selecting suitable audience according to his own goods or service to push the promotion. A current promotion displaying method mainly includes a promotion displaying method based on a keyword: the advertiser buys a keyword related to his goods or service, and then displays the promotional data to a netizen who has ever sought for the keyword (or a close keyword). A drawback of the prior art lies in that the promotional data corresponds to the keyword, the corresponding promotional data can be displayed only when the user's search hits the keyword corresponding to the promotion, and both the displaying efficiency and coverage rate of the promotional data are low.

SUMMARY

The present disclosure provides a method, an apparatus, a device and a computer storage medium for promotion displaying, to improve the displaying efficiency and coverage rate of the promotional data.

A technical solution employed by the present disclosure to address the technical problem is providing a method for promotion displaying which includes: using user's behavior data to perform intent recognition for the user; under the condition that an intent in a specific class is recognized, determining a target entity corresponding to the recognized intent in the specific class; expanding the recognized intent in the specific class using attribute information of the target entity; and displaying promotional data corresponding to the intent obtained from expansion to the user.

According to an embodiment of the present disclosure, the user's behavior data includes at least one type of user's query behavior data and browsing behavior data within a preset time period.

According to an embodiment of the present disclosure, using user's behavior data to perform intent recognition for the user includes: inputting the user's behavior data into an intent translating model obtained by pre-training to obtain an intent recognition result of the intent translating model.

According to an embodiment of the present disclosure, the intent translating model is obtained by pre-training in the following manner: obtaining training samples, the training samples including behavior data and intent annotation data corresponding to respective behavior data, the intent annotation data including an intent in a specific class; and training a classification model by taking respective behavior data as an input and taking the intent annotation data corresponding to respective behavior data as an output, to obtain the intent translating model.

According to an embodiment of the present disclosure, the specific class is an intent class hitting a promotion demand; the intent class hitting the promotion demand includes at least one of: an intent class hitting goods promotion, an intent class hitting service promotion, and an intent class hitting application download promotion.

According to an embodiment of the present disclosure, a knowledge graph of an industry to which the recognized intent in the specific class belongs is used to perform at least one of the step of determining the target entity corresponding to the recognized intent in the specific class, and the step of expanding the recognized intent in the specific class using attribute information of the target entity.

According to an embodiment of the present disclosure, using the knowledge graph of the industry to which the recognized intent in the specific class belongs to perform the step of determining the target entity corresponding to the recognized intent in the specific class includes: performing similarity calculation for the recognized intent in the specific class and an entity node in the knowledge graph, and taking an entity node satisfying a similarity requirement as the target entity corresponding to the recognized intent in the specific class.

According to an embodiment of the present disclosure, using the knowledge graph of the industry to which the recognized intent in the specific class belongs to perform the step of expanding the recognized intent in the specific class using attribute information of the target entity includes: determining an attribute node corresponding to the target entity in the knowledge graph; and using the determined attribute node to expand the recognized intent in the specific class.

A technical solution employed by the present disclosure to address the technical problem is providing an apparatus for promotion displaying which includes: a recognizing unit configured to use user's behavior data to perform intent recognition for the user; a determining unit configured to, under the condition that an intent in a specific class is recognized, determine a target entity corresponding to the recognized intent in the specific class; an expanding unit configured to expand the recognized intent in the specific class using attribute information of the target entity; and a displaying unit configured to display promotional data corresponding to the intent obtained from expansion to the user.

According to an embodiment of the present disclosure, the user's behavior data includes at least one type of the user's query behavior data and browsing behavior data within a preset time period.

According to an embodiment of the present disclosure, when using the user's behavior data to perform intent recognition for the user, the recognizing unit specifically performs: inputting the user's behavior data into an intent translating model obtained by pre-training to obtain an intent recognition result of the intent translating model.

According to an embodiment of the present disclosure, the apparatus further includes a training unit configured to pre-train in the following manner to obtain the intent translating model: obtaining training samples, the training samples including behavior data and intent annotation data corresponding to respective behavior data, the intent annotation data including an intent in a specific class; and training a classification model by taking respective behavior data as an input and taking the intent annotation data corresponding to respective behavior data as an output, to obtain the intent translating model.

According to an embodiment of the present disclosure, the specific class is an intent class hitting a promotion demand; the intent class hitting the promotion demand includes at least one of: an intent class hitting goods promotion, an intent class hitting service promotion, and an intent class hitting application download promotion.

According to an embodiment of the present disclosure, using a knowledge graph of an industry to which the recognized intent in the specific class belongs, the determining unit performs the operation of determining the target entity corresponding to the recognized intent in the specific class, and/or the expanding unit performs the operation of expanding the recognized intent in the specific class using attribute information of the target entity.

According to an embodiment of the present disclosure, when using the knowledge graph of the industry to which the recognized intent in the specific class belongs, to determine the target entity corresponding to the recognized intent in the specific class, the determining unit specifically performs: performing similarity calculation for the recognized intent in the specific class and an entity node in the knowledge graph, and regarding an entity node satisfying a similarity requirement as the target entity corresponding to the recognized intent in the specific class.

According to an embodiment of the present disclosure, using the knowledge graph of the industry to which the recognized intent in the specific class belongs, to expand the recognized intent in the specific class using attribute information of the target entity, the expanding unit specifically performs: determining an attribute node corresponding to the target entity in the knowledge graph; and using the determined attribute node to expand the recognized intent in the specific class.

It can be seen that, according to the technical solutions of the present disclosure, an intent in a specific class is obtained by recognizing the user's behavior data, a target entity corresponding to the intent in the specific class is determined, and then the intent in the specific class is expanded according to attribute information of the target entity, and promotional data corresponding to the intents obtained from the expansion is displayed to the user. By employing the manner of promotion displaying based on intent expansion, the relevant promotional data may be displayed to the user according to the user's intent, even though the user has not queried for an accurate keyword, and thus the displaying efficiency and coverage rate of the promotional data may be improved.

DETAILED DESCRIPTION

The present disclosure will be described in detail with reference to figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

Figure 1:
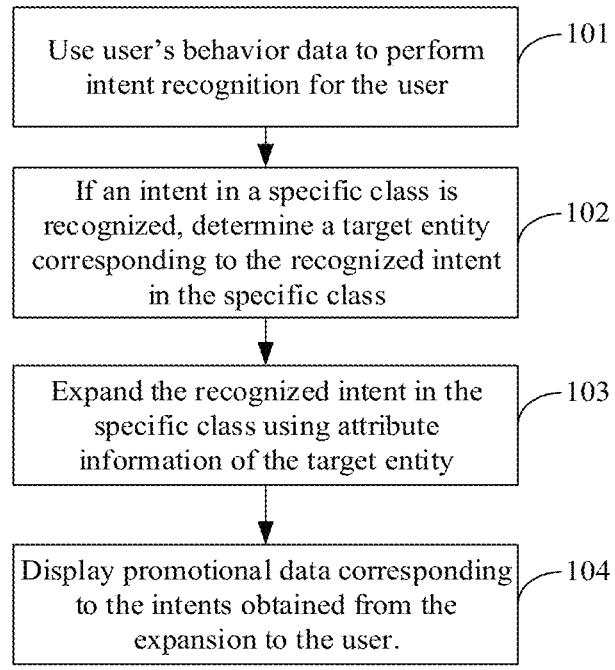
FIG. 1 is a flow chart of a promotion displaying method according to an embodiment of the present disclosure.

FIG. 1 is a flow chart of a promotion displaying method according to an embodiment of the present disclosure. As shown in FIG. 1, the method will be described as follows.

At 101, user's behavior data is used to perform intent recognition for the user.

In this step, it is feasible to first obtain the user's behavior data, and then perform intent recognition for the user according to the obtained user's behavior data. The obtained user's behavior data includes at least one type of user's query behavior data and user's browsing behavior data within a preset time period, for example, it is possible to obtain queries input by the user within one week, or obtain names of websites browsed by the user within one week. The present time period in the present disclosure may be three days, one week, two weeks or the like, and will not be limited by the present disclosure herein.

After obtaining the user's behavior data, the method may further include: filtering the obtained user's behavior data based on a preset screening rule, and performing intent recognition for the user according to the user's behavior data obtained from the filtration. Herein, the preset screening rule may be filtering out persons' name, place name, news website name, encyclopedia website name and so on.

When the user's behavior data is used to perform intent recognition for the user, the intent may be obtained with an intent translating model obtained by pre-training. The intent translating model may be obtained by pre-training in the following manner: obtaining training samples, the obtained training samples including behavior data and intent annotation data corresponding to respective behavior data, the intent annotation data corresponding to respective behavior data including an intent in a specific class; training a classification model by taking respective behavior data as an input and taking the intent annotation data corresponding to respective behavior data as an output, to obtain the intent translating model. The classification model may be a support vector machine, a recurrent neural network or the like. The intent recognition may be performed for the user, by using the intent translating model obtained by training, according to the user's behavior data, to obtain an intent recognition result corresponding to the user's behavior data.

At 102, under the condition that an intent in a specific class is recognized, a target entity corresponding to the recognized intent in the specific class is determined.

In this step, it is feasible to first judge whether the intent in the specific class is recognized, according to the intent obtained from the recognition in step 101, and if the intent in the specific class is recognized, further determine the target entity corresponding to the recognized intent in the specific class. If the intent in the specific class is not recognized, the following steps are not performed any longer.

In the present disclosure, the specific class is the intent class hitting the promotion demand, and the intent in the specific class is the intent of the intent class hitting the promotion demand. The intent class hitting the promotion demand includes: an intent class hitting goods promotion, an intent class hitting service promotion, an intent class hitting application download promotion, and so on. That is to say, an intent class hitting the promotion demand is an intent class for displaying the promotional data to the user according to the obtained intent.

Determining the target entity corresponding to the recognized intent in the specific class may employ the following manner: performing word segmentation processing for the intent in the specific class, and regarding a word segmentation result among word segmentation results satisfying a preset word characteristic as the target entity corresponding to the intent in the specific class, for example, taking a noun in the word segmentation results as the target entity corresponding to the intent in the specific class.

For example, it is possible to perform word segmentation processing for an intent in the specific class "want to buy a BMW X3" to obtain word segmentation results "want to", "buy" and "a BMW X3", and determine the noun "a BMW X3" among the word segmentation results as a target entity corresponding to the intent in the specific class "want to buy a BMW X3".

Determining the target entity corresponding to the recognized intent in the specific class may employ the following manner: using a knowledge graph to which the recognized intent in the specific class belongs to determine the target entity corresponding to the recognized intent in the specific class.

Obtaining an industry to which the intent in the specific class belongs may employ the following manner: pre-constructing a correspondence relationship between the intent in the specific class and the industry; and obtaining the industry to which the intent in the specific class belongs based on the pre-constructed correspondence relationship. It is also possible to employ the following manner: when an intent translating model is trained, the intent annotation data may include, besides an intent in the specific class, the industry to which the intent in the specific class belongs, so that the intent translating model obtained by training outputs, besides the intent in the specific class, the industry to which the intent in the specific class belongs.

For example, if the obtained user's behavior data is "how about BMW X3", "how about BMW X3" is taken as an input of the intent translating model; if an output result of the intent translating model is "want to buy a BMW X3" and "car", it is possible to take "want to buy a BMW X3" as the intent in the specific class corresponding to the user, and to take "car" as the industry to which the user's intent in the specific class belongs.

Using a knowledge graph to which an recognized intent in the specific class belongs to determine an target entity corresponding to the recognized intent in the specific class may employ the following manner: determining a knowledge graph corresponding to the industry to which the obtained intent in the specific class belongs; performing similarity calculation for the recognized intent in the specific class and entity nodes in the knowledge graph, and taking an entity node satisfying a similarity requirement as the target entity corresponding to the recognized intent in the specific class, for example, taking an entity node with a maximum similarity calculation result as the target entity corresponding to the intent in the specific class.

For example, it is possible to determine according to the "car" industry, to which the intent in the specific class "want to buy a BMW X3" belongs, that the corresponding knowledge graph is a "car" industry knowledge graph, then use entity nodes in the "car" industry knowledge graph to perform similarity calculation for "want to buy a BMW X3", and if it is obtained from the calculation that the entity node "BMW X3" in the "car" industry knowledge graph has a maximum similarity with "want to buy a BMW X3", determine the entity node "BMW X3" as the target entity corresponding to the intent in the specific class "want to buy a BMW X3".

At 103, the intent in the specific class is expanded using attribute information of the target entity.

In this step, it is possible to, according to the target entity corresponding to the intent in the specific class obtained in step 102, first determine the attribute information of the target entity, and then expand the intent in the specific class according to the determined attribute information, thereby obtaining the expanded intents.

The attribute information of the target entity may be determined from the knowledge graph. That is to say, in addition to the entity nodes, the knowledge graph also includes attribute nodes corresponding to respective entity nodes. The attribute nodes corresponding to each entity node include attribute information of each entity node, for example, includes brand information, price information, type information, origin information, location information and so on of each entity node.

For example, if the knowledge graph is a "car" industry knowledge graph, the attribute nodes corresponding to the target entity may include car brand, car price, car type, car origin, etc.; if the knowledge graph is a "house property" industry knowledge graph, the attribute nodes corresponding to the target entity may include property location, property type, property price, property education, property transportation, and so on.

After the attribute nodes corresponding to the target entity are determined, the intent in the specific class is expanded according to the determined attribute nodes, so that the intent in the specific class is expanded to the intents corresponding to the attribute nodes of the target entity. For example, if the user's intent in the specific class is "want to buy a BMW X3", the target entity corresponding thereto is "BMW X3" and attribute nodes corresponding to "BMW X3" include BMW car, Germany-produced car, price of RMB 400,000 yuan, and SUV, intent expansion is performed according to the attribute nodes of "BMW X3" to obtain intents "want to buy a BMW car", "want to buy a Germany-produced car", "want to buy a car at a price of RMB 400,000 yuan" and "want to buy an SUV", respectively.

It may be appreciated that the promotional data corresponding to each intent has been predetermined for each possible intent. That is to say, each intent has its corresponding promotional data, i.e., a promotion provider has obtained each possible intent in advance, and a promotion buyer buys the obtained intention, so that the promotional data corresponding to each intent may be displayed to the user after the intent corresponding to the user is determined.

At 104, promotional data corresponding to the intents obtained from the expansion are displayed to the user.

In this step, N intents are selected from the intents obtained from the expansion in step 103 according to a preset selection rule, N being a positive integer larger than or equal to 1, and the promotional data corresponding to the selected intents are displayed to the user.

The preset selection rule may be selecting one randomly from the plurality of intents, and displaying promotional data corresponding to the randomly selected intent to the user. It is also possible to calculate scores of respective intents by taking values of promotional data corresponding to respective intents and estimated click-through rates of promotional data as weights, sort the respective intents in a descending order of the scores, and then display promotional data corresponding to top M intents in the rank to the user, where M is a positive integer larger than or equal to 1, for example, display the promotional data corresponding to the intent ranking the first to the user.

For the above process, an example is given below:

The user's behavior data is obtained first, for example, the obtained user's behavior data includes query behavior data that the user queries "how about BMW X3", and browsing behavior data that the user browses webpages of "Lianjia-Huaqing Jianyuan"; then an intent in a specific class corresponding to the user's behavior data is obtained, for example, the pre-built intent translating model is used to obtain "want to buy a BMW X3" as the intent in the specific class corresponding to "how about a BMW X3" and "car" as the industry to which it belongs, or to obtain "want to buy an apartment in the residence area Huaqing Jiayuan" as the intent in the specific class corresponding to "Lianjia-Huaqing Jiayuan" and "house property" as the industry to which it belongs; then a target entity corresponding to the intent in the specific class is obtained, for example, from a knowledge graph, "BMW X3" is obtained as the target entity of "want to buy a BMW X3" and "Huaqing Jiayuan" is obtained as the target entity of "want to buy an apartment in the residence area Huaqing Jiayuan"; the user's intent in the specific class is expanded according to the attribute information of the target entity, for example, the intent in the specific class "want to buy a BMW X3" is expanded to intents "want to buy a BMW car", "want to buy a Germany-produced car" and "want to buy an SUV" according to the attribute information of "BMW X3" in the knowledge graph, or the intent in the specific class "want to buy an apartment in the residence area Huaqing Jiayuan" is expanded to "want to buy an apartment at Wudaokou", "want to buy an apartment nearby the subway" and "want to buy an apartment nearby a school" according to the attribute information of "Huaqing Jiayuan" in the knowledge graph; and finally an intent is selected from the intents obtained by the expansion, for example, the intent "want to buy a BMW car" or "want to buy an apartment nearby a school" is selected, and then promotional data corresponding to the intent "want to buy a BMW car" or "want to buy an apartment nearby a school" is displayed to the user.

In the prior art, when the promotional data is displayed to the user, only the corresponding promotional data can be displayed to the user who has ever queried for the keyword purchased by the advertiser. For example, only when the user has queried for "BMW X3" can promotional data corresponding to "BMW X3" be displayed to the user, so the displaying efficiency and coverage rate of the promotional data are low. According to the technical solution provided by the present disclosure, when the user has not queried for "BMW X3" but browsed a website related to "BMW X3", the promotional data corresponding to "BMW X3" may also be displayed to the user, so that the displaying efficiency and coverage rate of the promotional data are improved.

Figure 2:
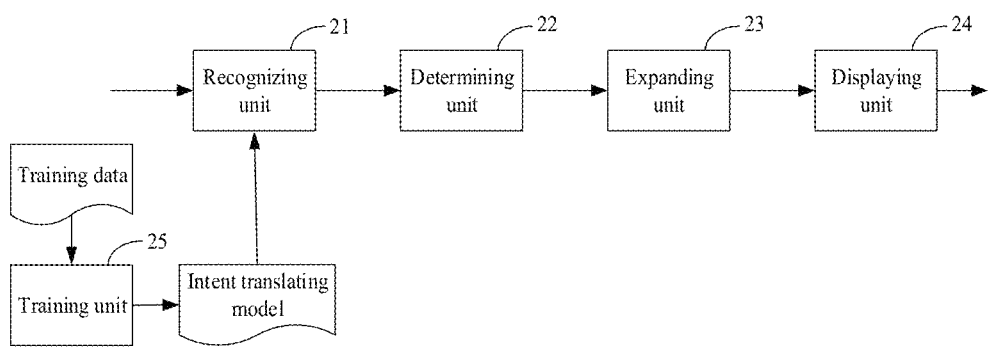
FIG. 2 is a structural diagram of a promotion displaying apparatus according to an embodiment of the present disclosure.

FIG. 2 is a structural diagram of a promotion displaying apparatus according to an embodiment of the present disclosure. As shown in FIG. 2, the apparatus includes: a recognizing unit 21, a determining unit 22, an expanding unit 23, a displaying unit 24 and a training unit 25.

The recognizing unit 21 is configured to use user's behavior data to perform intent recognition for the user.

The recognizing unit 21 first obtains the user's behavior data, and then performs intent recognition for the user according to the obtained user's behavior data. The user's behavior data obtained by the recognizing unit 21 includes at least one type of user's query behavior data and user's browsing behavior data within a preset time period, for example, obtain queries input by the user within one week, or obtain names of websites browsed by the user within one week. The present time period in the present disclosure may be three days, one week, two weeks or the like, and will not be limited by the present disclosure herein.

After obtaining the user's behavior data, the recognizing unit 21 may further perform: filtering the obtained user's behavior data based on a preset screening rule, and performing intent recognition for the user according to the user's behavior data obtained from the filtration. The preset screening rule may be filtering out persons' name, place name, news website name, encyclopedia website name and so on.

When the user's behavior data is used to perform intent recognition for the user, the recognizing unit 21 may be obtained with an intent translating model obtained by pre-training. The recognizing unit 21 takes the user's behavior data as input, and takes an output result of the intent translating model as an intent corresponding to the user's behavior data.

A training unit 25 is configured to pre-train to obtain the intent translating model.

The training unit 25 may pre-train to obtain the intent translating model in the following manner:

obtaining training samples, the obtained training samples including behavior data and intent annotation data corresponding to respective behavior data, the intent annotation data corresponding to the behavior data including an intent in a specific class; training a classification model by taking respective behavior data as an input and taking the intent annotation data corresponding to respective behavior data as an output, to obtain the intent translating model. The classification model may be a support vector machine, a recurrent neural network or the like. The intent translating model obtained from the training may be used to perform intent recognition for the user according to the user's behavior data.

It may be appreciated that when the intent translating model is trained, the intent annotation data may include, besides the intent in the specific class, the industry to which the intent in the specific class belongs, so that the intent translating model obtained by training outputs, besides the intent in the specific class, the industry to which the intent in the specific class belongs.

The determining unit 22 is configured to, under the condition that an intent in a specific class is recognized, determine a target entity corresponding to the recognized intent in the specific class.

The determining unit 22 first judges whether the intent in the specific class is recognized, according to the intent recognized by the recognizing unit 21, and if the intent in the specific class is recognized, further determines the target entity corresponding to the recognized intent in the specific class.

In the present disclosure, the specific class is the intent class hitting the promotion demand, and the intent in the specific class is the intent of the intent class hitting the promotion demand. The intent class hitting the promotion demand includes: an intent class hitting goods promotion, an intent class hitting service promotion, an intent class hitting application download promotion, and so on. That is to say, the intent class hitting the promotion demand is the intent class for displaying the promotional data to the user according to the obtained intent.

The determining unit 22 may determine the target entity corresponding to the recognized intent in the specific class in the following manner: performing word segmentation processing for the intent in the specific class, and taking a word segmentation result among word segmentation results satisfying a preset word characteristic as the target entity corresponding to the intent in the specific class, for example, taking a noun in the word segmentation results as the target entity corresponding to the intent in the specific class.

The determining unit 22 may determine the target entity corresponding to the recognized intent in the specific class in the following manner: using a knowledge graph to which the recognized intent in the specific class belongs to determine the target entity corresponding to the recognized intent in the specific class.

The determining unit 22 may obtain an industry to which the intent in the specific class belongs in the following manner: pre-constructing a correspondence relationship between the intent in the specific class and the industry; and obtaining the industry to which the intent in the specific class belongs based on the pre-constructed correspondence relationship. The determining unit 22 may directly obtains the industry to which the intent in the specific class belongs, directly according to an output result of the intent translating model.

The determining unit 22 may use the knowledge graph to which the recognized intent in the specific class belongs to determine the target entity corresponding to the recognized intent in the specific class in the following manner: determining a knowledge graph corresponding to the industry to which the obtained intent in the specific class belongs; performing similarity calculation for the recognized intent in the specific class and entity nodes in the knowledge graph, and taking an entity node satisfying a similarity requirement as the target entity corresponding to the recognized intent in the specific class, for example, taking an entity node with a maximum similarity calculation result as the target entity corresponding to the intent in the specific class.

The expanding unit 23 is configured to expand the intent in the specific class using attribute information of the target entity.

The expanding unit 23, according to the target entity corresponding to the intent in the specific class obtained by the determining unit 22, first determines the attribute information of the target entity, and then expands the intent in the specific class according to the determined attribute information, thereby obtaining the expanded intents.

The expanding unit 23 may determine the attribute information of the target entity from the knowledge graph. That is to say, in addition to the entity nodes, the knowledge graph also includes attribute nodes corresponding to respective entity nodes. The attribute nodes corresponding to each entity node include attribute information of each entity node, for example, includes brand information, price information, type information, origin information, location information and so on of each entity node.

After the attribute nodes corresponding to the target entity are determined, the expanding unit 23 expands the intent in the specific class according to the determined attribute nodes, so that the intent in the specific class is expanded to the intents corresponding to the attribute nodes of the target entity.

It may be appreciated that the promotional data corresponding to each intent may have been predetermined for each possible intent. That is to say, each intent has its corresponding promotional data, i.e., a promotion provider has obtained each possible intent in advance, and a promotion buyer buys the obtained intention, so that the promotional data corresponding to each intent may be presented to the user after the intent corresponding to the user is determined.

The displaying unit 24 is configured to display promotional data corresponding to the intents obtained from the expansion to the user.

The displaying unit 24 selects N intents from the intents obtained from the expansion of the expanding unit 23 according to a preset selection rule, N being a positive integer larger than or equal to 1, and then displays the promotional data corresponding to the selected intents to the user.

The preset selection rule may be selecting one randomly from the plurality of intents, and the displaying unit 24 displays promotional data corresponding to the randomly selected intent to the user. The displaying unit 24 may calculate scores of respective intents by taking values of promotional data corresponding to respective intents and estimated click-through rates of promotional data as weights, sort the respective intents in a descending order of the scores, and then display promotional data corresponding to top M intents in the rank to the user, where M is a positive integer larger than or equal to 1, for example, display the promotional data corresponding to the intent ranking the first to the user.

Figure 3:
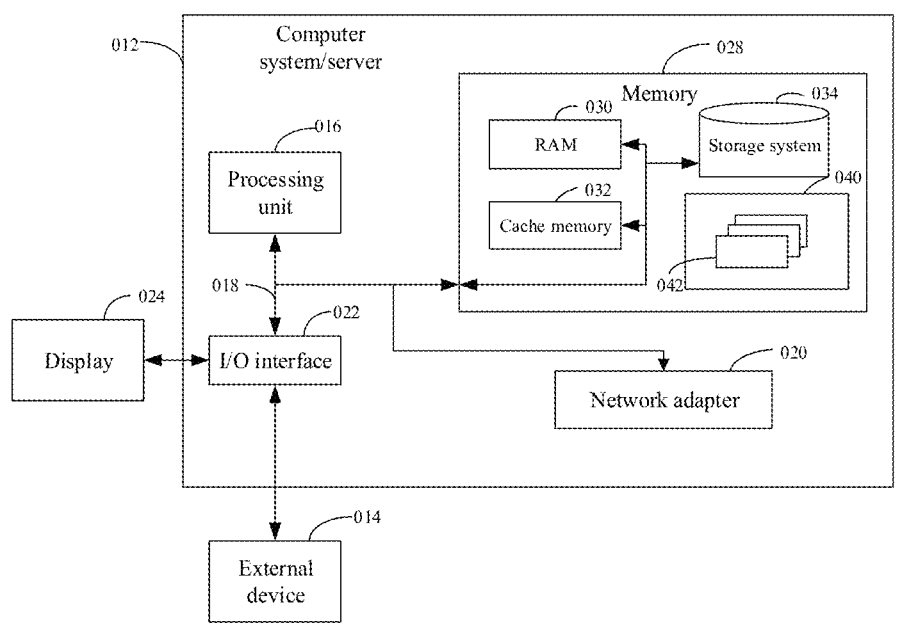
FIG. 3 is a block diagram of a computer system/server according to an embodiment of the present disclosure.

As shown in FIG. 3, a computer system/server 012 is shown in the form of a general-purpose computing device. The components of computer system/server 012 may include, but are not limited to, one or more processors or processing units 016, a system memory 028, and a bus 018 that couples various system components including the system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 may include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 may be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each drive may be connected to bus 018 by one or more data media interfaces. The memory 028 may include at least one program product having a set of (e.g., at least one) program modules that are configured to carry out the functions of embodiments of the present disclosure.

Program/utility 040, having a set of (at least one) program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methods of embodiments of the present disclosure.

Computer system/server 012 may communicate with one or more external devices 014 such as a keyboard, a pointing device, a display 024, etc., and in the present disclosure, the computer system/server 012 communicates with an external radar device, and may communicate with one or more devices that enable a user to interact with computer system/server 012; and/or with any devices (e.g., network card, modem, etc.) that enable computer system/server 012 to communicate with one or more other computing devices. Such communication may occur via an Input/Output (I/O) interface 022. Still yet, computer system/server 012 may communicate with one or more networks such as a local area network (LAN), a general wide area network (WAN), and/or a public network (e.g., the Internet) via network adapter 020. As shown in the figure, network adapter 020 communicates with the other modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the system memory 028, for example, implement a promotion displaying method which may include:

using user's behavior data to perform intent recognition for the user;

under the condition that an intent in a specific class is recognized, determining a target entity corresponding to the recognized intent in the specific class;

expanding the recognized intent in the specific class using attribute information of the target entity;

displaying promotional data corresponding to the intents obtained from the expansion to the user.

The aforesaid computer program may be arranged in the computer storage medium, namely, the computer storage medium may be encoded with a computer program which when executed by one or more computers, enables one or more computers to execute the flow of the method and/or operations of the apparatus as shown in the above embodiments of the present disclosure. For example, the flow of the method performed by the one or more processors may include:

using a user's behavior data to perform intent recognition for the user;

under the condition that an intent in a specific class is recognized, determining a target entity corresponding to the recognized intent in the specific class;

expanding the recognized intent in the specific class using attribute information of the target entity;

displaying promotional data corresponding to the intents obtained from the expansion to the user.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination thereof. More specific examples of the machine readable storage medium may include an electrical connection having one or more wires, a portable computer diskette, a hard disk, a random access memory (RAM), a read-only memory (ROM), an erasable programmable read-only memory (EPROM or Flash memory), a fiber, a portable compact disc read-only memory (CD-ROM), an optical storage device, a magnetic storage device, or any suitable combination thereof. In the text herein, the computer readable storage medium may be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be, besides the computer-readable storage medium, any computer-readable medium which may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the scenarios involving the remot computer, the remote computer may be connected to the user's computer through any type of network, including a local area network (LAN) or a wide area network (WAN), or the connection may be made to an external computer (for example, through the Internet using an Internet Service Provider).

According to the technical solution disclosed in the present disclosure, an intent in the specific class is obtained by recognizing the user's behavior data, a target entity corresponding to the intent in the specific class is determined, the intent in the specific class is expanded according to attribute information of the target entity, promotional data corresponding to the intents obtained from the expansion is finally displayed to the user. Accordingly, the promotional data may be displayed to the user according to the user's intent, even if the user has not queried for an accurate keyword, and therefore the displaying efficiency and coverage rate of the promotional data may be improved.

In the embodiments disclosed in the present disclosure, it should be understood that the revealed system, apparatus and method may be implemented in other ways. For example, the above-described embodiments for the apparatus are only exemplary, e.g., the division of the units is merely logical one, and, in reality, they may be divided in other ways upon implementation.

The units described as separate parts may be or may not be physically separated, the parts shown as units may be or may not be physical units, i.e., they may be located in one place, or distributed in a plurality of network units. Some or all the units may be selected to achieve the purpose of the embodiment according to the actual needs.

Further, in the embodiments of the present disclosure, functional units may be integrated in one processing unit, or they may be separate physical presences; or two or more units may be integrated in one unit. The integrated unit described above may be implemented in the form of hardware, or they may be implemented with hardware plus software functional units.

The aforementioned integrated unit in the form of software function units may be stored in a computer readable storage medium. The aforementioned software function units may be stored in a storage medium, including several instructions to instruct a computer device, such as a personal computer, server, or network equipment, etc., or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

The above mentioned contents are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for promotion displaying implemented by a computer device, comprising:
   obtaining training samples, the training samples including behavior data including at least one type of query behavior data and browsing behavior data and intent annotation data corresponding to respective behavior data, the intent annotation data including an annotated intent in an annotated specific class and an industry to which the annotated intent in the annotated specific class belongs;
   training a classification model by taking respective behavior data as an input and taking the intent annotation data corresponding to respective behavior data as an output, to obtain the intent translating model, wherein the classification model comprises a support vector machine or a recurrent neural network;
   obtaining user's behavior data including at least one type of user's query behavior data and browsing behavior data within a preset time period;
   filtering the user's behavior data based on a preset screening rule;
   performing intent recognition for the user by inputting the user's behavior data filtered into the intent translating model to obtain an intent recognition result;
   under the condition that an intent in a specific class is recognized according to the intent recognition result, performing a similarity calculation for the recognized intent in the specific class and an entity node in a knowledge graph of an industry to which the recognized intent in the specific class belongs, and using an entity node satisfying a similarity requirement as a target entity corresponding to the recognized intent in the specific class;
   acquiring one or more attribute nodes corresponding to the target entity in the knowledge graph;
   expanding the recognized intent in the specific class using the one or more attribute nodes of the target entity, to obtain one or more expanded intents corresponding to the one or more attribute nodes respectively; and
   displaying promotional data corresponding to the one or more expanded intents obtained from the expansion to the user.

2. The method according to claim 1, wherein the specific class is an intent class corresponding to a promotion demand; the intent class corresponding to the promotion demand comprises at least one of an intent class corresponding to goods promotion, an intent class corresponding to service promotion, and an intent class corresponding to application download promotion.

3. A computer device, comprising a memory, a processor and a computer program which is stored on the memory and runs on the processor, wherein the processor, upon executing the program, implements a method for promotion displaying, wherein the method comprises:
   obtaining training samples, the training samples including behavior data including at least one type of query behavior data and browsing behavior data and intent annotation data corresponding to respective behavior data, the intent annotation data including an annotated intent in an annotated specific class and an industry to which the annotated intent in the annotated specific class belongs;
   training a classification model by taking respective behavior data as an input and taking the intent annotation data corresponding to respective behavior data as an output, to obtain the intent translating model, wherein the classification model comprises a support vector machine or a recurrent neural network:
   obtaining user's behavior data including at least one type of user's query behavior data and browsing behavior data within a preset time period;
   filtering the user's behavior data based on a preset screening rule;
   performing intent recognition for the user by inputting the user's behavior data filtered into the intent translating model to obtain an intent recognition result;
   under the condition that an intent in a specific class is recognized according to the intent recognition result, performing a similarity calculation for the recognized intent in the specific class and an entity node in a knowledge graph of an industry to which the recognized intent in the specific class belongs, and using an entity node satisfying a similarity requirement as a target entity corresponding to the recognized intent in the specific class;

acquiring one or more attribute nodes corresponding to the target entity in the knowledge graph;

expanding the recognized intent in the specific class using the one or more attribute nodes of the target entity, to obtain one or more expanded intents corresponding to the one or more attribute nodes respectively; and displaying promotional data corresponding to the one or more expanded intents obtained from the expansion to the user.

4. A non-transitory computer-readable storage medium on which a computer program is stored, wherein the program, when executed by a processor, implements a method for promotion displaying, wherein the method comprises:

obtaining training samples, the training samples including behavior data including at least one type of query behavior data and browsing behavior data and intent annotation data corresponding to respective behavior data, the intent annotation data including an annotated intent in an annotated specific class and an industry to which the annotated intent in the annotated specific class belongs;

training a classification model by taking respective behavior data as an input and taking the intent annotation data corresponding to respective behavior data as an output, to obtain the intent translating model, wherein the classification model comprises a support vector machine or a recurrent neural network;

obtaining user's behavior data including at least one type of user's query behavior data and browsing behavior data within a preset time period;

filtering the user's behavior data based on a preset screening rule;

performing intent recognition for the user by inputting the user's behavior data filtered into the intent translating model to obtain an intent recognition result;

under the condition that an intent in a specific class is recognized according to the intent recognition result, performing a similarity calculation for the recognized intent in the specific class and an entity node in a knowledge graph of an industry to which the recognized intent in the specific class belongs, and using an entity node satisfying a similarity requirement as a target entity corresponding to the recognized intent in the specific class;

acquiring one or more attribute nodes corresponding to the target entity in the knowledge graph;

expanding the recognized intent in the specific class using the one or more attribute nodes of the target entity, to obtain one or more expanded intents corresponding to the one or more attribute nodes respectively; and displaying promotional data corresponding to the one or more expanded intents obtained from the expansion to the user.

* * * * *